(12) United States Patent
Zeng et al.

(10) Patent No.: US 11,050,124 B2
(45) Date of Patent: Jun. 29, 2021

(54) BATTERY MODULE, BUSBAR AND BUSBAR ASSEMBLY THEREOF

(71) Applicant: CONTEMPORARY AMPEREX TECHNOLOGY CO., LIMITED, Ningde (CN)

(72) Inventors: Yuqun Zeng, Ningde (CN); Fenggang Zhao, Ningde (CN); Shengtian Cai, Ningde (CN); Yangzhi Huang, Ningde (CN); Chuanlian Chen, Ningde (CN); Daohui Liu, Ningde (CN)

(73) Assignee: CONTEMPORARY AMPEREX TECHNOLOGY CO., LTD., Ningde (CN)

( * ) Notice: Subject to any disclaimer, the term of this patent is extended or adjusted under 35 U.S.C. 154(b) by 110 days.

(21) Appl. No.: 16/517,448

(22) Filed: Jul. 19, 2019

(65) Prior Publication Data

US 2020/0091487 A1 Mar. 19, 2020

(30) Foreign Application Priority Data

Sep. 14, 2018 (CN) .......................... 201811074071.0

(51) Int. Cl.
*H01M 50/502* (2021.01)
*H01M 50/20* (2021.01)

(52) U.S. Cl.
CPC ......... *H01M 50/502* (2021.01); *H01M 50/20* (2021.01)

(58) Field of Classification Search
CPC ........ H01M 2/20; H01M 2/202; H01M 2/204; H01M 2/206; H01M 2/208; H01M 50/502; H01M 50/20
See application file for complete search history.

(56) References Cited

U.S. PATENT DOCUMENTS

| 7,612,647 B2* | 11/2009 | Onoda ............... H01H 85/2045 337/159 |
| 2009/0023305 A1* | 1/2009 | Korich ................. H01M 2/206 439/34 |

(Continued)

FOREIGN PATENT DOCUMENTS

| CN | 106953059 A | 7/2017 |
| DE | 202017006171 U1 | 2/2018 |

(Continued)

OTHER PUBLICATIONS

Contemporary Amperex Technology Co., Limited, Extended European Search Report, EP19187038.5, dated Oct. 10, 2019, 8 pgs.

*Primary Examiner* — Matthew J Merkling
(74) *Attorney, Agent, or Firm* — Morgan, Lewis & Bockius LLP

(57) ABSTRACT

The present disclosure provides a battery module, a busbar and a busbar assembly thereof. The busbar comprises a first connecting portion, a second connecting portion and a first main portion. The first connecting portion is connected to a first battery of the battery module, the second connecting portion is connected to a second battery. The first main portion connects the first connecting portion and the second connecting portion, and the first connecting portion and the second connecting portion are positioned at the same side of the first main portion in a transverse direction. The first connecting portion and the second connecting portion are spaced from each other in a longitudinal direction, and a first slit is formed between the first connecting portion and the second connecting portion. The first main portion is provided with a first notch, the first notch is communicated with the first slit.

9 Claims, 8 Drawing Sheets

(56) References Cited

U.S. PATENT DOCUMENTS

| | | | |
|---|---|---|---|
| 2010/0173178 A1* | 7/2010 | Kim | H01M 2/206 429/1 |
| 2012/0019061 A1* | 1/2012 | Nishihara | H01M 2/206 307/10.1 |
| 2012/0328920 A1* | 12/2012 | Takase | H01M 2/0285 429/90 |
| 2014/0212732 A1* | 7/2014 | Ichikawa | H01M 2/206 429/158 |
| 2014/0308568 A1* | 10/2014 | Kim | H01M 2/0473 429/158 |
| 2015/0270525 A1 | 9/2015 | Jeong et al. | |
| 2016/0172649 A1* | 6/2016 | Morgan | H01M 2/1077 429/90 |
| 2016/0308187 A1 | 10/2016 | Subramanian et al. | |
| 2017/0062789 A1* | 3/2017 | Sim | H01M 2/206 |
| 2017/0110705 A1* | 4/2017 | Tosaya | H01M 2/206 |
| 2017/0125770 A1* | 5/2017 | Kim | H01M 2/204 |
| 2019/0273239 A1* | 9/2019 | Sato | H01M 2/10 |

FOREIGN PATENT DOCUMENTS

| | | | |
|---|---|---|---|
| EP | 2713423 A1 | 4/2014 | |
| EP | 3226342 A1 | 10/2017 | |

* cited by examiner

BATTERY MODULE, BUSBAR AND BUSBAR ASSEMBLY THEREOF

CROSS-REFERENCE TO RELATED APPLICATIONS

The present application claims priority to Chinese patent application No. CN201811074071.0, filed on Sep. 14, 2018, which is incorporated herein by reference in its entirety.

FIELD OF THE PRESENT DISCLOSURE

The present disclosure relates to the field of battery, and particularly relates to a battery module, a busbar and a busbar assembly thereof.

BACKGROUND OF THE PRESENT DISCLOSURE

A battery module generally comprises a plurality of batteries and a plurality of busbars, the busbars are connected with the batteries to realize the electrical connection of the batteries. However, in the existing battery module, the busbar generally comprises a connecting portion and a main portion, the connecting portion is provided as plurality in number, and the plurality of connecting portions are spaced from each other, each connecting portion is connected with a battery; the main portion connects the plurality of connecting portions. The battery 1 swells in the working process, which leads to a stretching stress being applied to the connecting portion; the stretching stress will concentrate to a connecting position between the connecting portion and the main portion, which is prone to result in the busbar being ruptured in the connecting position, thereby affecting an overcurrent capability and working life of the busbar.

SUMMARY OF THE PRESENT DISCLOSURE

In view of the problem existing in the background, an object of the present disclosure is to provide a battery module, a busbar and a busbar assembly thereof, which can disperse the stress in the busbar and avoid the busbar being ruptured.

In order to achieve the above object, the present disclosure provides a battery module, a busbar and a busbar assembly thereof.

The busbar comprises a first connecting portion, a second connecting portion and a first main portion. The first connecting portion is capable of being connected to a first battery of the battery module, the second connecting portion is capable of being connected to a second battery of the battery module. The first main portion connects the first connecting portion and the second connecting portion, and the first connecting portion and the second connecting portion are positioned at the same side of the first main portion in a transverse direction. The first connecting portion and the second connecting portion are spaced from each other in a longitudinal direction, and a first slit is formed between the first connecting portion and the second connecting portion. The first main portion is provided with a first notch, the first notch is communicated with the first slit.

The first connecting portion has a first surface at a side close to the second connecting portion, the second connecting portion has a second surface at a side close to the first connecting portion, the first slit is positioned between the first surface and the second surface. The first main portion comprises a third surface, the third surface is provided along an edge of the first notch. The third surface comprises a first arc section, two ends of the first arc section are respectively connected with the first surface and the second surface.

The first surface and the second surface are planes and parallel with each other.

The first arc section is a circular arc surface, and a diameter of the circular arc surface is greater than a distance from the first surface to the second surface.

The third surface further comprises a second arc section and a third arc section. The second arc section connects the first surface and the first arc section, and the second arc section is inclined relative to the first surface toward a direction close to the second connecting portion. The third arc section connects the second surface and the first arc section, the third arc section is inclined relative to the second surface toward a direction away from the first connecting portion, and an arc length of the third arc section is less than an arc length of the second arc section.

The first connecting portion comprises a first flat-plate region and a first bending region, the first flat-plate region is capable of being connected to the first battery, the first bending region connects the first flat-plate region and the first main portion. A height difference exists between the first flat-plate region and the first main portion, the first bending region bends relative to the first main portion toward a direction close to the first flat-plate region. The second connecting portion comprises a second flat-plate region and a second bending region, the second flat-plate region is capable of being connected to the second battery, the second bending region connects the second flat-plate region and the first main portion. A height difference exists between the second flat-plate region and the first main portion, the second bending region bends relative to the first main portion toward a direction close to the second flat-plate region.

The busbar further comprises a third connecting portion, the third connecting portion is capable of being connected to a third battery of the battery module. The first battery, the second battery, and the third battery are capable of being arranged in the longitudinal direction. The first main portion is further connected with the third connecting portion; the first connecting portion, the second connecting portion and the third connecting portion are positioned at the same side of the first main portion in the transverse direction.

In an embodiment, a battery module comprises a battery and the aforementioned busbar. The battery is provided as plurality in number and sequentially arranged in the longitudinal direction. The first connecting portion is connected with a first battery, the second connecting portion is connected with a second battery.

A busbar assembly comprises a first busbar, a second busbar and an insulator. The first busbar is the aforementioned busbar. The second busbar comprises a fourth connecting portion, a fifth connecting portion and a second main portion. The fourth connecting portion is capable of being connected to a fourth battery, the fifth connecting portion is capable of being connected to a fifth battery, the second main portion connects the fourth connecting portion and the fifth connecting portion. The first main portion and the second main portion are insulated by the insulator. The first battery, the second battery, the fourth battery, the third battery and the fifth battery are capable of being arranged sequentially in the longitudinal direction.

In another embodiment, a battery module comprises a battery and the aforementioned busbar assembly. The battery is provided as plurality in number and sequentially arranged in a longitudinal direction. The first connecting portion is connected with a first battery, the second connecting portion is connected with a second battery, the third connecting portion is connected with a third battery, the fourth connecting portion is connected to a fourth battery, the fifth connecting portion is connected to a fifth battery. The first battery, the second battery, the fourth battery, the third battery and the fifth battery are arranged sequentially in the longitudinal direction.

The present disclosure has the following beneficial effects: in the battery module of the present disclosure, the main portion of the busbar is provided with the notch, the notch is communicated with the slit between the connecting portions. When the batteries swell, the width of the slit in the longitudinal direction increases; at the same time, the stretching stresses applied to the connecting portions will concentrate to a part of the main portion at the notch. Compared to the connecting portions, the main portion has a larger width in the longitudinal direction; by making use of an extensibility of the main portion in the longitudinal direction, it can effectively disperse the stress due to the swelling of the batteries. At the same time, the notch further can increase an area bearing the stress, and helps the dispersal of stress.

Figure 1:
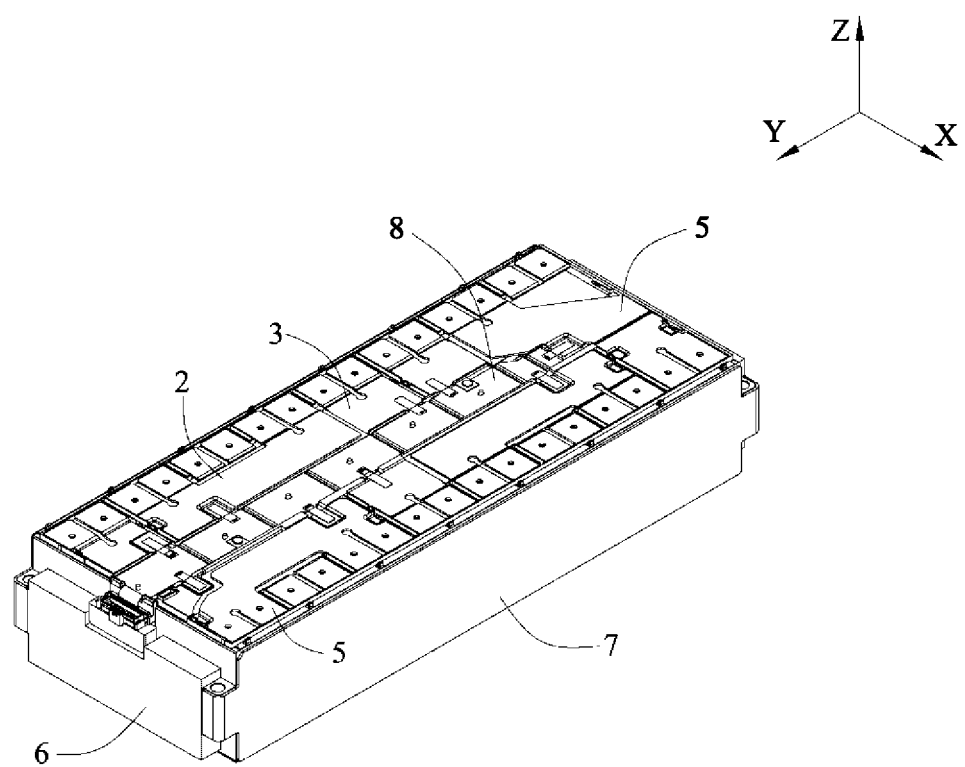
FIG. 1 is a schematic view of an embodiment of a battery module according to the present disclosure.

Reference numerals in figures are represented as follows:
1 battery
  11 first battery
  12 second battery
  13 third battery
  14 fourth battery
  15 fifth battery
  16 sixth battery
2 first busbar
  21 first connecting portion
    211 first flat-plate region
    212 first bending region
  22 second connecting portion
    221 second flat-plate region
    222 second bending region
  23 first main portion
  24 third connecting portion
  25 sixth connecting portion
3 second busbar
  31 fourth connecting portion
  32 fifth connecting portion
  33 second main portion
4 insulator
5 third busbar
6 end plate
7 side plate
8 wiring harness assembly
G1 first slit
G2 first notch
G3 second slit
G4 second notch
S1 first surface
S2 second surface
S3 third surface
  S31 first arc section
  S32 second arc section
  S33 third arc section
  S34 fourth straight section
P recessed portion
T1 positive electrode terminal
T2 negative electrode terminal
X transverse direction
Y longitudinal direction
Z height direction

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined, the terms "first", "second", "third" and the like are used for illustrative purposes only and are not to be construed as expressing or implying a relative importance. The term "plurality" is two or more. Unless otherwise defined or illustrated, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the present disclosure. Hereinafter the present disclosure will be further described in detail in combination with the exemplary embodiments and the figures.

Figure 2:
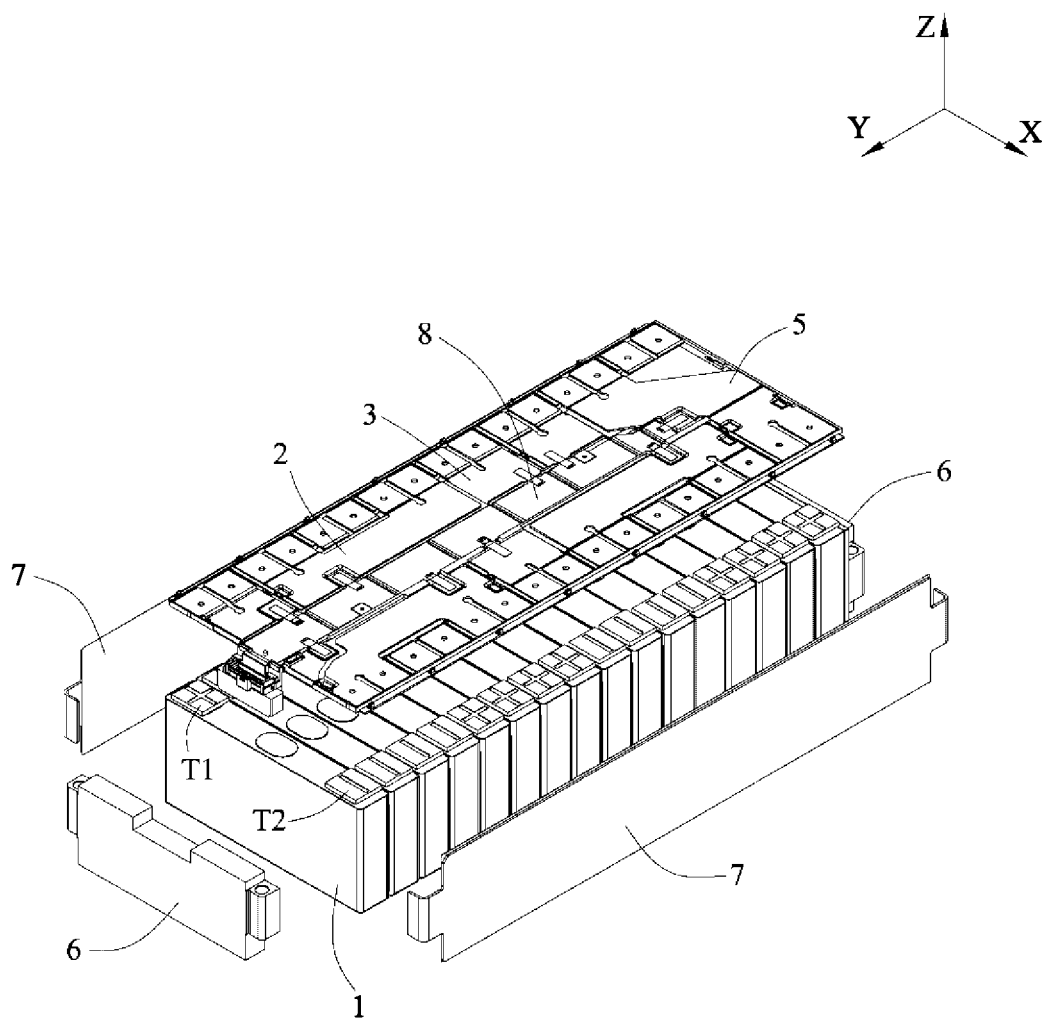
FIG. 2 is an exploded view of the battery module of FIG. 1.

Referring to FIG. 1 and FIG. 2, a battery module comprises a battery 1, a busbar assembly, an end plate 6, a side plate 7 and a wiring harness assembly 8.

The battery 1 may be a prismatic lithium-ion battery, and have two electrode terminals protruded outwardly from the top thereof, that is a positive electrode terminal T1 and a negative electrode terminal T2. The battery 1 is provided as plurality in number and the batteries 1 are sequentially arranged in a longitudinal direction Y. The end plate 6 is provided as two in number and the two end plates 6 are respectively provided to two ends of the batteries 1 in a longitudinal direction Y, the side plate 7 is provided as two in number and the two side plates 7 are respectively provided to two sides of the batteries 1 in a transverse direction X, the end plates 6 and the side plates 7 are welded together to form a rectangular frame. The batteries 1 can be fixed with the frame by bonding and the like. The wiring harness assembly 8 is provided above the batteries 1. The busbar assembly is fixed with the wiring harness assembly 8 and comprises a plurality of busbars, the busbars electrically connect the batteries 1, so as to realize the charge and the discharge of the battery module. The wiring harness assembly 8 can collect the information of each battery 1 via the busbars, such as the electric current, the voltage and the like.

Figure 3:
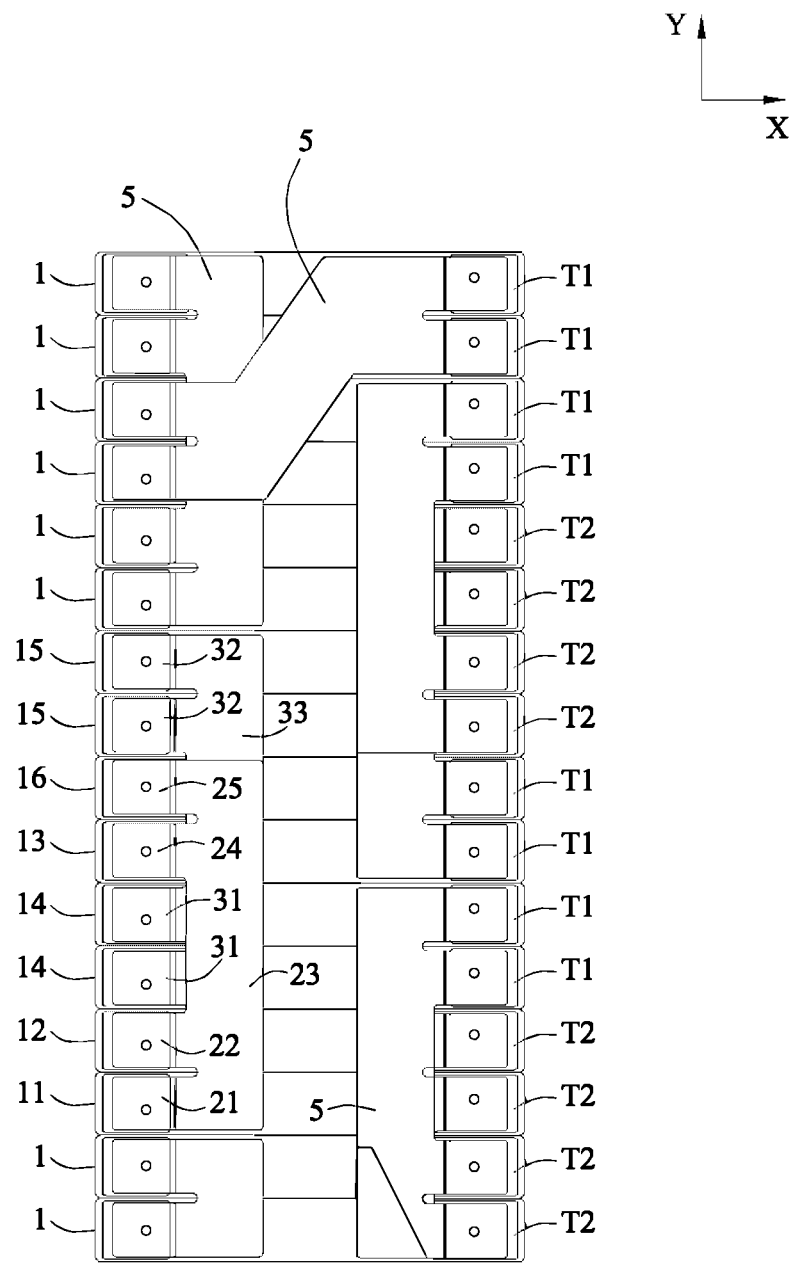
FIG. 3 is a schematic view of a battery and a busbar assembly connected together.

In a first embodiment of the battery module of the present disclosure, referring to FIG. 2 and FIG. 3, the busbar assembly comprises a first busbar 2, a second busbar 3 and a third busbar 5. The first busbar 2, the second busbar 3 and the third busbar 5 each are an integral metal member in the shape of plate.

The first busbar 2 comprises a first connecting portion 21, a second connecting portion 22 and a first main portion 23, the first connecting portion 21 may be connected to a first battery 11 of the battery module by welding, the second connecting portion 22 may be connected to a second battery 12 of the battery module by welding, the first main portion 23 connects the first connecting portion 21 and the second connecting portion 22, the first connecting portion 21 and the second connecting portion 22 are positioned at the same side of the first main portion 23 in the transverse direction X.

The first connecting portion 21 may be connected with the positive electrode terminal T1 of the first battery 11, the second connecting portion 22 may be connected with the negative electrode terminal T1 of the second battery 12; because the first main portion 23 connects the first connecting portion 21 and the second connecting portion 22, the first busbar 2 connects the first battery 11 and the second battery 12 in series. Alternatively, the first busbar 2 also can connect the first battery 11 and the second battery 12 in parallel.

In the assembling process of the battery module, the batteries 1 need to be stacked sequentially; a height difference may exist between the adjacent batteries 1 in a height direction Z due to assembling errors. If the first connecting portion 21 and the second connecting portion 22 are connected directly, when a height difference exists between the first battery 11 and the second battery 12, the height difference will affect the connecting strength between the first connecting portion 21 and the first battery 11 or the connecting strength between the second connecting portion 22 and the second battery 12, thereby leading to poor welding and affecting the overcurrent capability of the first busbar 2. Therefore, preferably, referring to FIG. 4, the first connecting portion 21 and the second connecting portion 22 are spaced from each other in the longitudinal direction Y, and a first slit G1 is formed between the first connecting portion 21 and the second connecting portion 22. When welding, both of the first connecting portion 21 and the second connecting portion 22 can independently deflect up and down, thereby absorbing the height difference between the first battery 11 and the second battery 12, ensuring the connecting strength and the overcurrent capability.

The batteries 1 swell in the working process; when the batteries 1 swell, a distance between electrode terminals of two adjacent batteries 1 may increase. Specifically, when the first battery 11 and the second battery 12 swell, two stretching stress along opposite directions will be respectively applied to the first connecting portion 21 and the second connecting portion 22, thereby leading to a width of the first slit G1 in the longitudinal direction Y increasing. When the width of the first slit G1 increases, the stretching stress will concentrate to a connecting position between the first connecting portion 21 and the first main portion 23 and a connecting position between the second connecting portion 22 and the first main portion 23, and the first busbar 2 is prone to be ruptured under the effect of the stretching stress.

In the present disclosure, referring to FIG. 5 to FIG. 10, the first main portion 23 is provided with a first notch G2, the first notch G2 is communicated with the first slit G1. When the first battery 11 and the second battery 12 swell, the width of the first slit G1 in the longitudinal direction Y increases, at the same time, the stretching stresses applied to the first connecting portion 21 and the second connecting portion 22 will concentrate to a part of the first main portion 23 at the first notch G2. Compared to the first connecting portion 21 and the second connecting portion 22, the first main portion 23 has a larger width in the longitudinal direction Y; by making use of an extensibility of the first main portion 23 in the longitudinal direction Y, it can effectively disperse the stress due to the swelling of the batteries 1. At the same time, the first notch G2 further can increase an area bearing the stress, and helps the dispersal of stress.

The first slit G1 and the first notch G2 can be formed in the first busbar 2 by ways of stamping, cutting and the like.

Figure 6:
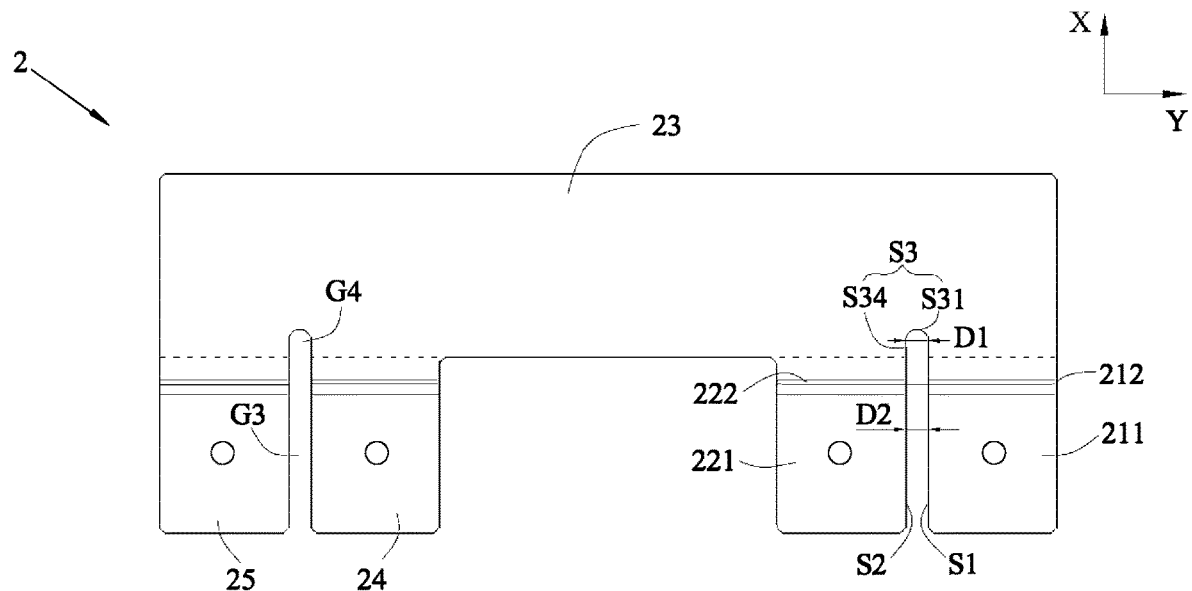
FIG. 6 is a top view of the first busbar of FIG. 5.

Referring to FIG. 6, the first connecting portion 21 has a first surface S1 at a side close to the second connecting portion 22, the second connecting portion 22 has a second surface S2 at a side close to the first connecting portion 21, the first slit G1 is positioned between the first surface S1 and the second surface S2. The first main portion 23 comprises a third surface S3, the third surface S3 is provided along an edge of the first notch G2. The first busbar 2 can be made of a metal plate with a uniform thickness, so the first surface S1, the second surface S2 and the third surface S3 are parallel to the height direction Z.

The third surface S3 comprises a first arc section S31, two ends of the first arc section S31 are respectively connected with the first surface S1 and the second surface S2. In an embodiment, referring to FIG. 6, the two ends of the first arc section S31 are respectively indirectly connected with the first surface S1 and the second surface S2 via two fourth straight sections S34; the fourth straight section S34 is a plane. Alternatively, the two ends of the first arc section S31 also can be directly connected with the first surface S1 and the second surface S2 respectively.

A projection of the first arc section S31 in the height direction Z is an arc. The first arc section S31 can transfer stress and make the distribution of stress more uniform, thereby relieving concentration of stress to a certain extent and reducing failure probability of the first busbar 2.

The first surface S1 and the second surface S2 are planes and parallel with each other. Preferably, both of the first surface S1 and the second surface S2 are perpendicular to the longitudinal direction Y. A distance D2 between the first surface S1 and the second surface S2 is a constant value.

Figure 7:
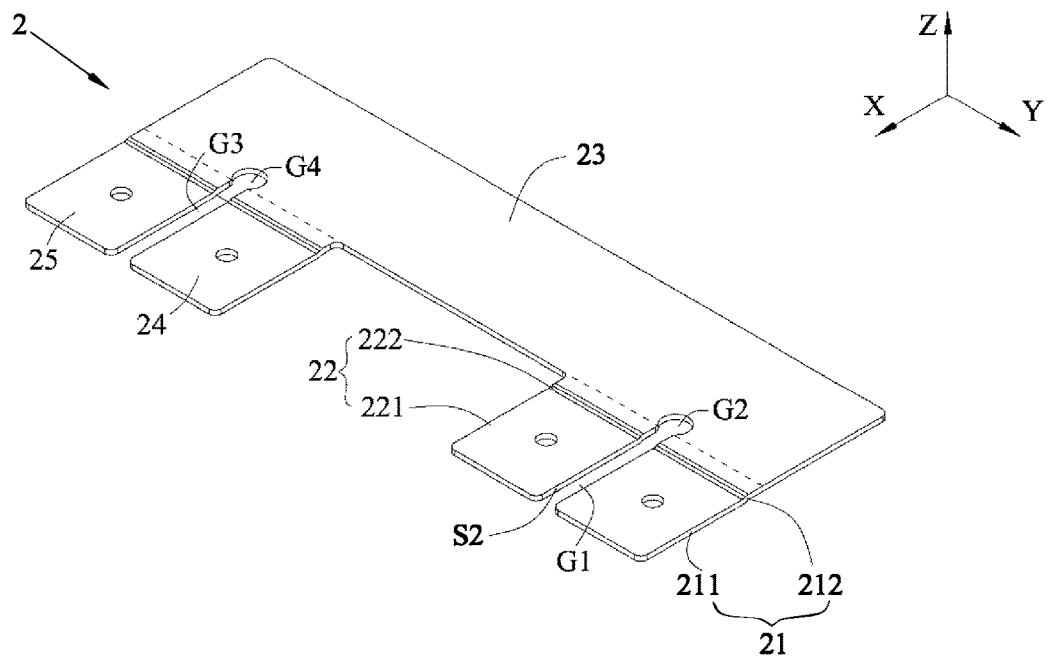
FIG. 7 is a schematic view of another embodiment of the first busbar of the busbar assembly of the present disclosure.
Figure 8:
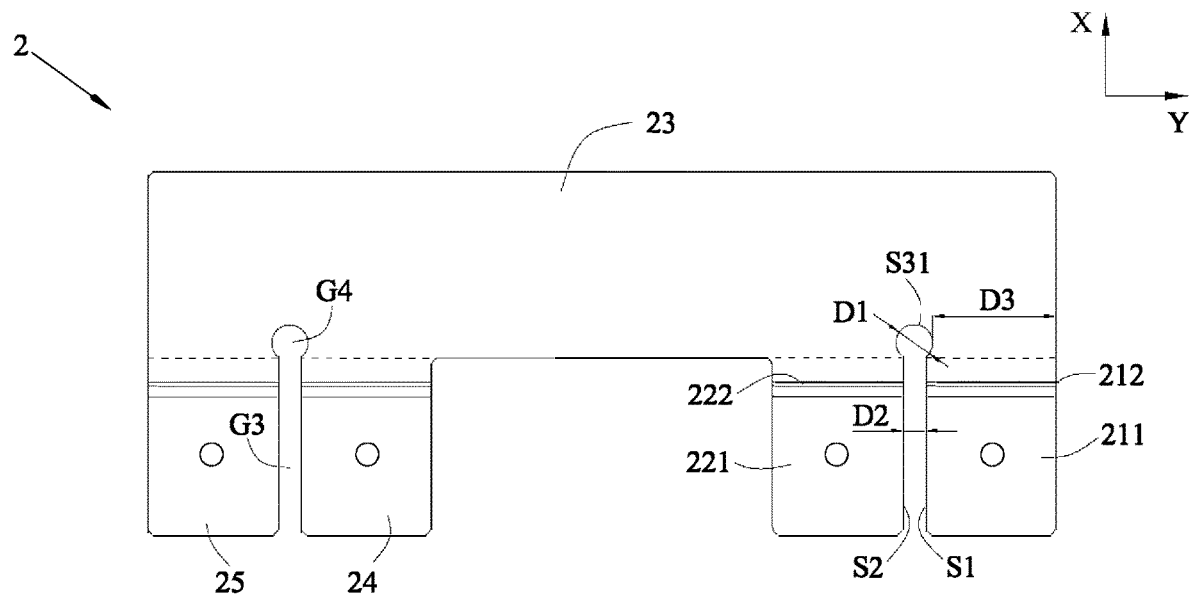
FIG. 8 is a top view of the first busbar of FIG. 7.

Referring to FIG. 7 and FIG. 8, preferably, the first arc section S31 is a circular arc surface, and a diameter D1 of the circular arc surface is greater than the distance D2 from the first surface S1 to the second surface S2. It can cut out one circular hole with a large diameter from the first main portion 23, and in turn form the first notch G2 in the first main portion 23; at the same time, the first arc section S31 of the first main portion 23 is formed around the first notch G2. By providing the first arc section S31 as the circular arc surface, it can make the stress disperse along the normal directions of the circular arc surface, thereby reducing concentration of stress. In addition, by increasing the diameter D1 of the circular arc surface, it further can increase area bearing the stress and helps dispersal of stress.

Figure 9:
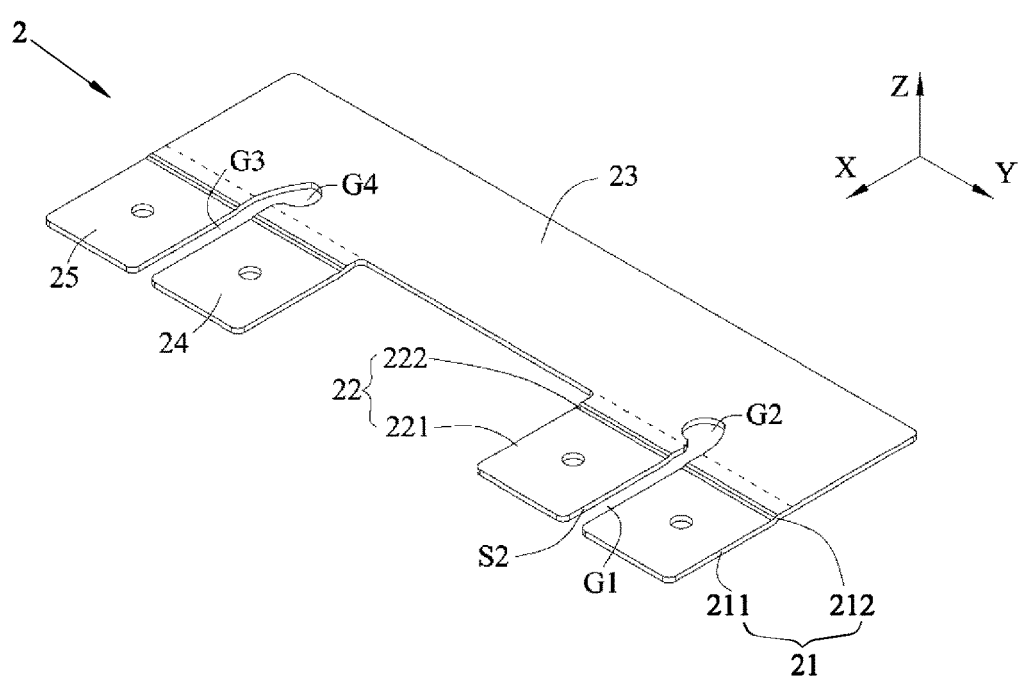
FIG. 9 is a schematic view of still another embodiment of the first busbar of the busbar assembly of the present disclosure.
Figure 10:
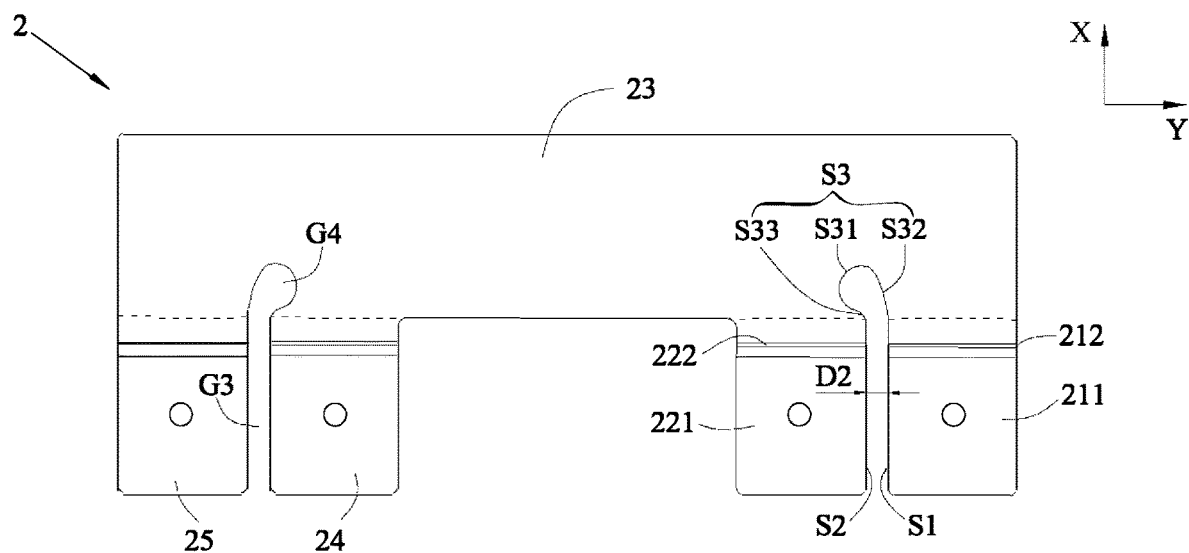
FIG. 10 is a top view of the first busbar of FIG. 9.

Referring to FIG. 9 and FIG. 10, the third surface S3 further comprises a second arc section S32 and a third arc section S33, both of the second arc section S32 and the third arc section S33 are arc surfaces. The second arc section S32 connects the first surface S1 and the first arc section S31, and the second arc section S32 is inclined relative to the first surface S1 toward a direction close to the second connecting portion 22. The third arc section S33 connects the second surface S2 and the first arc section S31, the third arc section S33 is inclined relative to the second surface S2 toward a direction away from the first connecting portion 21, and an arc length of the third arc section S33 is less than an arc length of the second arc section S32. By providing the second arc section S32 and the third arc section S33, it can further increase distribution range of stress, improve concentration of stress and avoid failure of the first busbar 2.

The first connecting portion 21 comprises a first flat-plate region 211 and a first bending region 212, the first flat-plate region 211 may be connected to the electrode terminal of the first battery 11 by welding, the first bending region 212 connects the first flat-plate region 211 and the first main portion 23. A height difference exists between the first flat-plate region 211 and the first main portion 23, the first bending region 212 bends relative to the first main portion 23 toward a direction close to the first flat-plate region 211. When the battery module is subjected to vibration, the first battery 11 may move in the height direction Z; the first bending region 212 can be elastically deformed to absorb a movement of the first battery 11 in the height direction Z, thereby functioning for buffering, avoid the first busbar 2 being ruptured in the connecting position between the first connecting portion 21 and the first main portion 23.

Similarly, the second connecting portion 22 comprises a second flat-plate region 221 and a second bending region 222, the second flat-plate region 221 may be connected to the second battery 12 by welding, the second bending region 222 connects the second flat-plate region 221 and the first main portion 23. A height difference exists between the second flat-plate region 221 and the first main portion 23, the second bending region 222 bends relative to the first main portion 23 toward a direction close to second flat-plate region 221. When the battery module is subjected to vibration, the second bending region 222 can function for buffering, thereby avoid the first busbar 2 being ruptured in the connecting position between the second connecting portion 22 and the first main portion 23.

Referring to FIG. 3 to FIG. 10, the first busbar 2 further comprises a third connecting portion 24 and a sixth connecting portion 25, the third connecting portion 24 may be connected to the electrode terminal of a third battery 13 by welding, the sixth connecting portion 25 may be connected to the electrode terminal of a sixth battery 16 by welding. The first battery 11, the second battery 12, the third battery 13 and the sixth battery 16 are arranged in the longitudinal direction Y. The first main portion 23 is further connected with the third connecting portion 24 and the sixth connecting portion 25, the first connecting portion 21, the second connecting portion 22, the third connecting portion 24 and the sixth connecting portion 25 are positioned at the same side of the first main portion 23 in the transverse direction X. Preferably, other batteries 1 are provided between the second battery 12 and the third battery 13.

The third connecting portion 24 and the sixth connecting portion 25 are spaced from each other in the longitudinal direction Y, and a second slit G3 is formed between the third connecting portion 24 and the sixth connecting portion 25. When welding, both of the third connecting portion 24 and the sixth connecting portion 25 can independently deflect up and down, thereby absorbing a height difference between the third battery 13 and the sixth battery 16, ensuring the connecting strength and the overcurrent capability.

The first main portion 23 is provided with a second notch G4, the second notch G4 is communicated with the second slit G3. The second notch G4 can effectively disperse the stress due to the swelling of the batteries, avoid the first busbar 2 being ruptured.

The second busbar 3 comprises a fourth connecting portion 31, a fifth connecting portion 32 and a second main portion 33; the fourth connecting portion 31 may be connected to a fourth battery 14 of the battery module by welding, the fifth connecting portion 32 may be connected to a fifth battery 15 of the battery module by welding, the second main portion 33 connects the fourth connecting portion 31 and the fifth connecting portion 32. Referring to FIG. 3, the fourth connecting portion 31 can be connected with the negative electrode terminal T2 of the fourth battery 14, the fifth connecting portion 32 can be connected with the positive electrode terminal T1 of the fifth battery 15; because the second main portion 33 connects the fourth connecting portion 31 and the fifth connecting portion 32, the second busbar 3 connects the fourth battery 14 and the fifth battery 15 in series.

The fourth connecting portion 31 may be provided as plurality in number, and the plurality of the fourth connecting portions 31 are spaced from each other in the longitudinal direction Y, each fourth connecting portion 31 is connected with one corresponding fourth battery 14. Similarly, the fifth connecting portion 32 may be provided as plurality in number, and the plurality of the fifth connecting portions 32 are spaced from each other in the longitudinal direction Y, each fifth connecting portion 32 is connected with one corresponding fifth battery 15.

The first battery 11, the second battery 12, the fourth battery 14, the third battery 13, the sixth battery 16 and the fifth battery 15 are arranged sequentially in the longitudinal direction Y. Because the fourth battery 14 is interposed between the second battery 12 and the third battery 13, the first main portion 23 needs to cross the fourth battery 14; similarly, the third battery 13 and the sixth battery 16 are interposed between the fourth battery 14 and the fifth battery 15, so the second main portion 33 needs to cross the third battery 13 and the sixth battery 16.

When the first main portion 23 crosses the fourth battery 14, the first main portion 23 is prone to contact the second main portion 33; similarly, when the second main portion 33 crosses the third battery 13 and the sixth battery 16, the second main portion 33 is also prone to contact the first main portion 23; when the first main portion 23 and the second main portion 33 are contacted with each other, it will result in a short circuit. By providing an insulator 4 between the first busbar 2 and the second busbar 3, the present disclosure can insulate the first main portion 23 from the second main portion 33, and avoid an electrical connection between the first busbar 2 and the second busbar 3.

Figure 4:
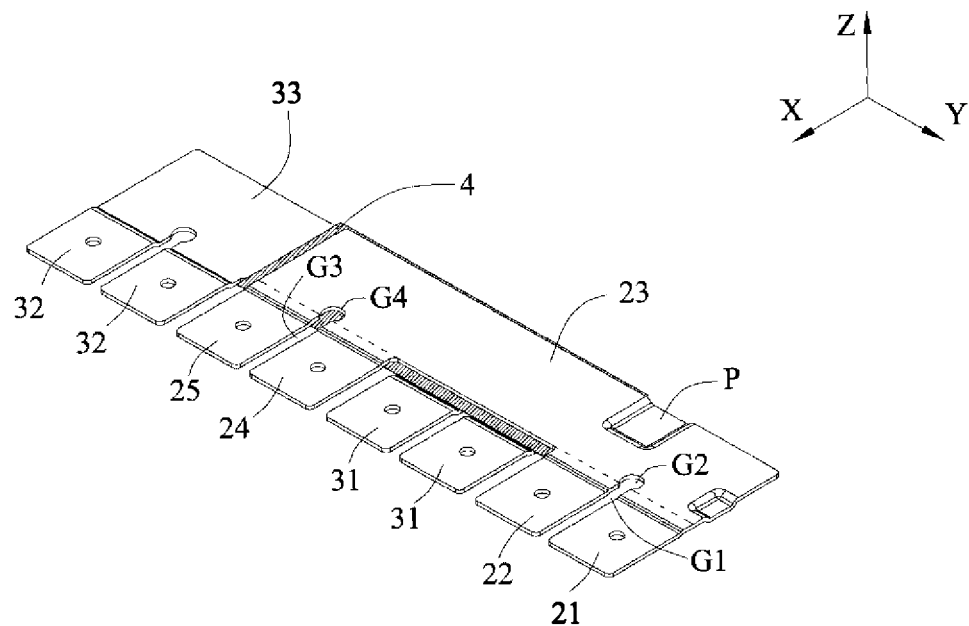
FIG. 4 is a schematic view of the busbar assembly according to the present disclosure.
Figure 5:
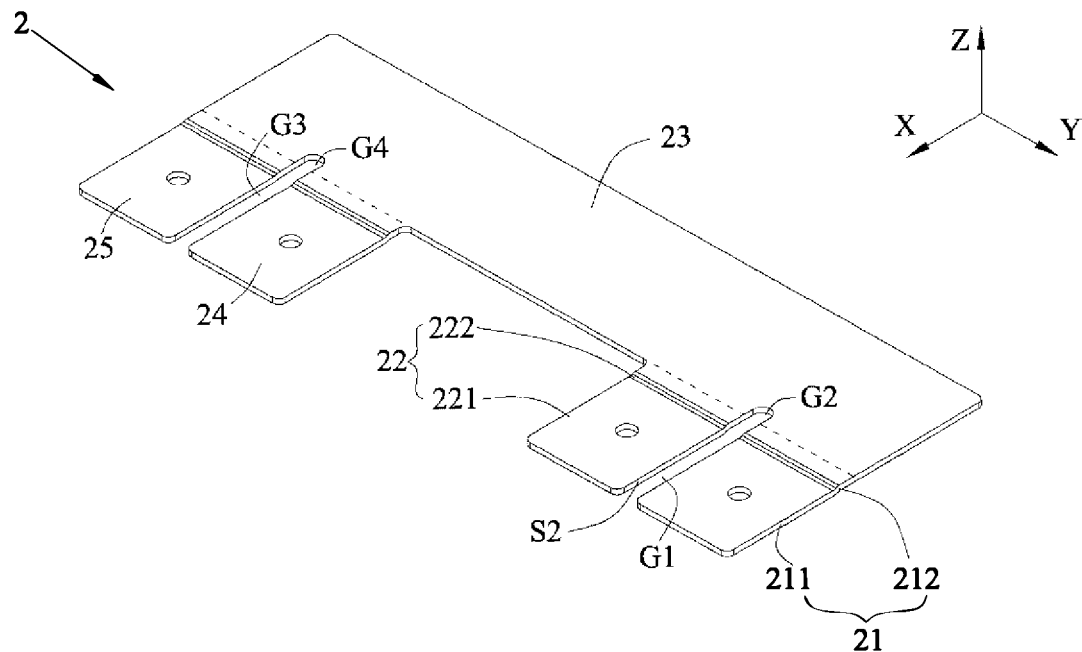
FIG. 5 is a schematic view of an embodiment of a first busbar of the busbar assembly of the present disclosure.

In order to save a space occupied by the first busbar 2 and the second busbar 3 in the transverse direction X, preferably, the first busbar 2 and the second busbar 3 are arranged up and down in the height direction Z. Referring to FIG. 4, in the height direction Z, the first main portion 23 and the second main portion 33 are partially overlapped with each other, and the insulator 4 is interposed between overlapped parts of the first main portion 23 and the second main portion 33. In order to satisfy the requirement of the creepage distance and the electric clearance between the first busbar 2 and the second busbar 3, an edge of the insulator 4 should be beyond the overlapped region between the second main portion 33 and the first main portion 23, preferably, the edge of the insulator 4 is beyond the overlapping region by at least 2 mm. The insulator 4 functions for insulation, compression resistance, bonding and polymerization, and two surface of the insulator 4 are respectively bonded to the first main portion 23 and the second main portion 33.

The third busbar 5 can be provided as plurality in number, the first busbar 2, the second busbar 3 and the third busbars 5 connect all the batteries 1 together.

In the battery module of the present disclosure, the busbar can connect batteries 1 between which other battery is interposed, and by allowing the busbars to reasonably cooperate with each other, it can realize the diversification of an electrical circuit in the battery module, satisfy the requirement of the battery module on diversified electrical circuit.

In addition, by allowing the busbars to reasonably cooperate with each other, it further can position a positive output electrode and a negative output electrode at the same side, realize the output of the battery module at the same side, and simplify a connecting structure between battery modules.

The first connecting portion 21, the second connecting portion 22, the fourth connecting portion 31, the third connecting portion 24, the sixth connecting portion 25 and the fifth connecting portion 32 are arrange sequentially and spaced from each other in the longitudinal direction Y.

In the battery module, regardless of the assembling errors, the electrode terminals of all batteries 1 should be positioned in a plane, and the first busbar 21 and the second busbar 22 are arranged up and down in the height direction Z, so the first busbar 21 or the second busbar 22 needs to be bent, so as to satisfy assembling requirement. For example, the first connecting portion 21 bends toward the second main portion 33 and forms a first flat-plate region 211 and a first bending region 212, the first bending region 212 can compensate the height difference between the first busbar 21 and the second busbar 22, so as to satisfy the assembling requirement. Similarly, all of the second connecting portion 22, the third connecting portion 24 and the sixth connecting portion 25 also can have bending structures the same as the first connecting portion 21.

Referring to FIG. 8, when the diameter D1 of the first notch G2 increases, a minimum width D3 of a part of the first main portion 23 positioned outside the first notch G2 will decrease, thereby affecting the overcurrent capability of the first busbar 2. When electric current flowing through, the first main portion 23 may generate a high temperature in the part having the minimum width D3 and be fused, thereby leading to failure of the first busbar 2. Therefore, referring to FIG. 10, preferably, the third surface S3 of the first main portion 213 further comprises the second arc section S32 and the third arc section S33. Because the second arc section S32 is inclined relative to the first surface S1 toward the direction close to the second connecting portion 22, the width of the part of the first main portion 23 positioned outside the first notch G2 will not decrease, thereby ensuring the overcurrent area. In addition, in the longitudinal direction Y, the first main portion 23 has a larger width at a side close to the third arc section S33, therefore, even if the third arc section S33 is inclined relative to the second surface S2 toward a direction away from the first connecting portion 21, as long as the arc length and the inclining angle of the third arc section S33 is reasonable adjusted, it can ensure the overcurrent area of the first main portion 23 at the side close to the third arc section S33 and avoid fuse.

All of the first connecting portion 21, the second connecting portion 22, the fourth connecting portion 31, the third connecting portion 24, the sixth connecting portion 25 and the fifth connecting portion 32 each are provided with a recognizing hole for positioning when welding.

Referring to FIG. 4, a plurality of recessed portions P may be formed in the first main portion 23 by stamping. The wiring harness assembly 8 may be provided with protrusions, one protrusion extends into one recessed portion P, thereby fixing the first busbar 2 to the wiring harness assembly 8. The wiring harness assembly 8 also can be connected to a bottom wall of another recessed portion P via one nickel piece; the nickel piece can transmit the information, such as electric current and voltage of the batteries 1, to the wiring harness assembly 8.

Figure 11:
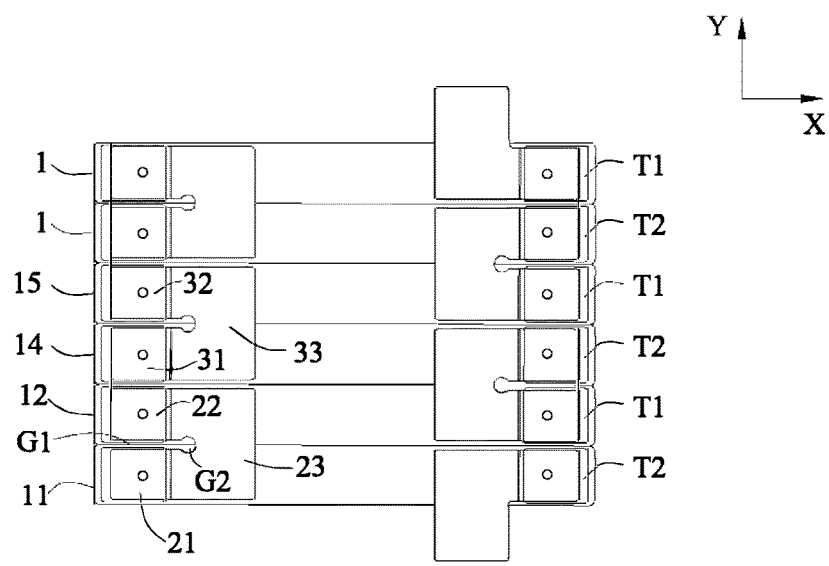
FIG. 11 is a schematic view of yet another embodiment of the battery module according to the present disclosure.
Figure 12:
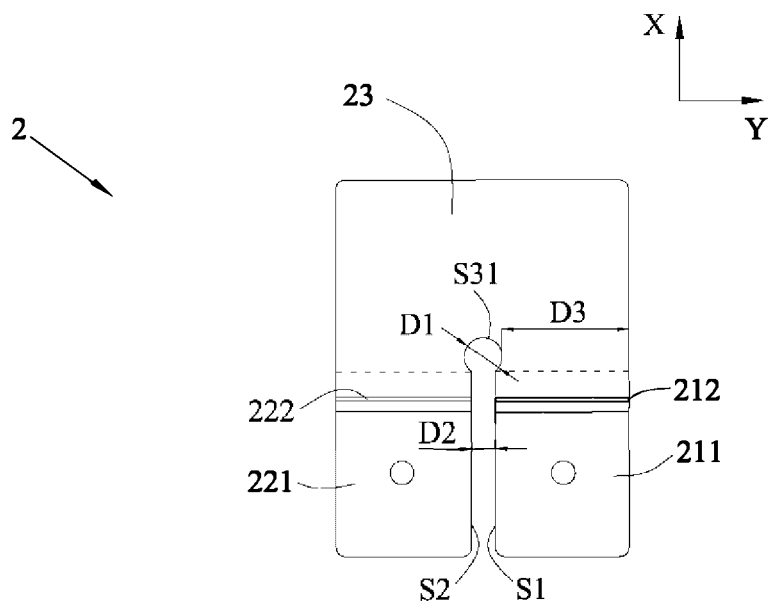
FIG. 12 is a schematic view of the busbar of FIG. 11.

In a second embodiment of the battery module of the present disclosure, referring to FIG. 11 and FIG. 12, the busbar assembly comprises a first busbar 2 and a second busbar 3. The first busbar 2 is the same as the second busbar 3.

The first busbar 2 comprise a first connecting portion 21, a second connecting portion 22 and a first main portion 23, the first connecting portion 21 may be connected to a first battery 11 of the battery module by welding, the second connecting portion 22 may be connected to a second battery 12 of the battery module by welding, the first main portion 23 connects the first connecting portion 21 and the second connecting portion 22, the first connecting portion 21 and the second connecting portion 22 are positioned at the same side of the first main portion 23 in the transverse direction X.

The second busbar 3 comprises a fourth connecting portion 31, a fifth connecting portion 32 and a second main portion 33; the fourth connecting portion 31 may be connected to a fourth battery 14 of the battery module by welding, the fifth connecting portion 32 may be connected to a fifth battery 15 of the battery module by welding, the second main portion 33 connects the fourth connecting portion 31 and the fifth connecting portion 32. The first battery 11, the second battery 12, the fourth battery 14 and the fifth battery 15 are arranged sequentially in the longitudinal direction Y.

Compared to the first embodiment, the first busbar 2 and the second busbar 3 of the second embodiment are not overlapped with each other.

Referring to FIG. 11, the first connecting portion 21 and the second connecting portion 22 are spaced from each other in the longitudinal direction Y, and a first slit G1 is formed between the first connecting portion 21 and the second connecting portion 22. When welding, both of the first connecting portion 21 and the second connecting portion 22 can independently deflect up and down, thereby absorbing a height difference between the first battery 11 and the second battery 12, ensuring the connecting strength and the overcurrent capability.

The first main portion 23 is provided with a first notch G2, the first notch G2 is communicated with the first slit G1. When the first battery 11 and the second battery 12 swell, a width of the first slit G1 in the longitudinal direction Y increases, at the same time, the stretching stress applied to the first connecting portion 21 and the second connecting portion 22 will concentrate to a part of the first main portion 23 at the first notch G2. Compared to the first connecting portion 21 and the second connecting portion 22, the first main portion 23 has a larger width in the longitudinal direction Y; by making use of an extensibility of the first main portion 23 in the longitudinal direction Y, it can effectively disperse the stress due to the swelling of the batteries 1. At the same time, the first notch G2 further can increase an area bearing the stress, and helps the dispersal of stress.

Referring to FIG. 12, the first connecting portion 21 has a first surface S1 at a side close to the second connecting portion 22, the second connecting portion 22 has a second surface S2 at a side close to the first connecting portion 21, the first slit G1 is positioned between the first surface S1 and the second surface S2. The first main portion 23 comprises a third surface S3, the third surface S3 is provided along an edge of the first notch G2. The first busbar 2 can be made of a metal plate with a uniform thickness, so the first surface S1, the second surface S2 and the third surface S3 are parallel to a height direction Z.

The third surface S3 comprises a first arc section S31, two ends of the first arc section S31 are respectively connected with the first surface S1 and the second surface S2. A projection of the first arc section S31 in the height direction Z is an arc. The first arc section S31 can transfer stress and make the distribution of stress more uniform, thereby relieving concentration of stress to a certain extent and reducing failure probability of the first busbar 2.

The first surface S1 and the second surface S2 are planes and parallel with each other. Preferably, both of the first surface S1 and the second surface S2 are perpendicular to the longitudinal direction Y. A distance D2 between the first surface S1 and the second surface S2 is a constant value.

Preferably, the first arc section S31 is a circular arc surface, and a diameter D1 of the circular arc surface is greater than the distance D2 from the first surface S1 to the second surface S2. It can cut out one circular hole with a large diameter from the first main portion 23, and in turn form the first notch G2 in the first main portion 23; at the same time, the first arc section S31 of the first main portion 23 is formed around the first notch G2. By providing the first arc section S31 as the circular arc surface, it can make the stress disperse along the normal directions of the circular arc surface, thereby reducing concentration of stress. In addition, by increasing the diameter D1 of the circular arc surface, it further can increase area bearing the stress and helps dispersal of stress.

What is claimed is:

1. A busbar of a battery module, comprising a first connecting portion, a second connecting portion and a first main portion;
the first connecting portion being capable of being connected to a first battery of the battery module, the second connecting portion being capable of being connected to a second battery of the battery module;
the first main portion connecting the first connecting portion and the second connecting portion, and the first connecting portion and the second connecting portion being positioned at the same side of the first main portion in a transverse direction;
the first connecting portion and the second connecting portion being spaced from each other in a longitudinal direction, and a first slit being formed between the first connecting portion and the second connecting portion;
the first main portion being provided with a first notch, the first notch being communicated with the first slit;
wherein the first connecting portion has a first surface at a side close to the second connecting portion, the second connecting portion has a second surface at a side close to the first connecting portion, the first slit is positioned between the first surface and the second surface;
the first main portion comprises a third surface, the third surface is provided along an edge of the first notch;
the third surface comprises a first arc section, two ends of the first arc section are respectively connected with the first surface and the second surface;
the first surface and the second surface are planes and parallel with each other;
the third surface further comprises a second arc section and a third arc section;
the second arc section connects the first surface and the first arc section, and the second arc section is inclined relative to the first surface toward a direction close to the second connecting portion; and
the third arc section connects the second surface and the first arc section, the third arc section is inclined relative to the second surface toward a direction away from the first connecting portion, and an arc length of the third arc section is less than an arc length of the second arc section.

2. The busbar according to claim 1, wherein the first arc section is a circular arc surface, and a diameter of the circular arc surface is greater than a distance from the first surface to the second surface.

3. The busbar according to claim 1, wherein
the first connecting portion comprises a first flat-plate region and a first bending region, the first flat-plate region is capable of being connected to the first battery, the first bending region connects the first flat-plate region and the first main portion;
a height difference exists between the first flat-plate region and the first main portion, the first bending region bends relative to the first main portion toward a direction close to the first flat-plate region;
the second connecting portion comprises a second flat-plate region and a second bending region, the second flat-plate region is capable of being connected to the second battery, the second bending region connects the second flat-plate region and the first main portion;
a height difference exists between the second flat-plate region and the first main portion, the second bending region bends relative to the first main portion toward a direction close to the second flat-plate region.

4. The busbar according to claim 1, wherein
the busbar further comprises a third connecting portion, the third connecting portion is capable of being connected to a third battery of the battery module;
the first battery, the second battery, and the third battery are capable of being arranged in the longitudinal direction;
the first main portion is further connected with the third connecting portion, the first connecting portion, the second connecting portion and the third connecting portion are positioned at the same side of the first main portion in the transverse direction.

5. A battery module, comprising a battery and a busbar;
the battery being provided as plurality in number and sequentially arranged in a longitudinal direction;
the busbar comprising a first connecting portion, a second connecting portion and a first main portion;
the first connecting portion being connected with a first battery, the second connecting portion being connected with a second battery;

the first main portion connecting the first connecting portion and the second connecting portion, and the first connecting portion and the second connecting portion being positioned at the same side of the first main portion in a transverse direction;

the first connecting portion and the second connecting portion being spaced from each other in the longitudinal direction, and a first slit being formed between the first connecting portion and the second connecting portion;

the first main portion being provided with a first notch, the first notch being communicated with the first slit;

wherein the first connecting portion has a first surface at a side close to the second connecting portion, the second connecting portion has a second surface at a side close to the first connecting portion, the first slit is positioned between the first surface and the second surface;

the first main portion comprises a third surface, the third surface is provided along an edge of the first notch;

the third surface comprises a first arc section, two ends of the first arc section are respectively connected with the first surface and the second surface;

the first surface and the second surface are planes and parallel with each other;

the third surface further comprises a second arc section and a third arc section;

the second arc section connects the first surface and the first arc section, and the second arc section is inclined relative to the first surface toward a direction close to the second connecting portion; and the third arc section connects the second surface and the first arc section, the third arc section is inclined relative to the second surface toward a direction away from the first connecting portion, and an arc length of the third arc section is less than an arc length of the second arc section.

6. The battery module according to claim 5, wherein the first arc section is a circular arc surface, and a diameter of the circular arc surface is greater than a distance from the first surface to the second surface.

7. The battery module according to claim 5, wherein the first connecting portion comprises a first flat-plate region and a first bending region, the first flat-plate region is connected with the first battery, the first bending region connects the first flat-plate region and the first main portion;

a height difference exists between the first flat-plate region and the first main portion, the first bending region bends relative to the first main portion toward a direction close to the first flat-plate region;

the second connecting portion comprises a second flat-plate region and a second bending region, the second flat-plate region is connected with the second battery, the second bending region connects the second flat-plate region and the first main portion;

a height difference exists between the second flat-plate region and the first main portion, the second bending region bends relative to the first main portion toward a direction close to second flat-plate region.

8. The battery module according to claim 5, wherein the busbar further comprises a third connecting portion, the third connecting portion is connected with a third battery of the battery module;

the first battery, the second battery, and the third battery are arranged in the longitudinal direction;

the first main portion is further connected with the third connecting portion, the first connecting portion, the second connecting portion and the third connecting portion are positioned at the same side of the first main portion in the transverse direction.

9. A battery module, comprising a battery and a busbar assembly;

the battery being provided as plurality in number and sequentially arranged in a longitudinal direction;

the busbar assembly comprising a first busbar, a second busbar and an insulator;

the first busbar comprising a first connecting portion, a second connecting portion, a first main portion and a third connecting portion;

the first connecting portion being connected with a first battery, the second connecting portion being connected with a second battery, the third connecting portion being connected with a third battery;

the first main portion being connected with the first connecting portion, the second connecting portion and the third connecting portion;

the first connecting portion, the second connecting portion and the third connecting portion being positioned at the same side of the first main portion in a transverse direction;

the first connecting portion and the second connecting portion being spaced from each other in the longitudinal direction, and a first slit being formed between the first connecting portion and the second connecting portion;

the first main portion being provided with a first notch, the first notch being communicated with the first slit;

the second busbar comprising a fourth connecting portion, a fifth connecting portion and a second main portion;

the fourth connecting portion being connected with a fourth battery, the fifth connecting portion being connected with a fifth battery, the second main portion connecting the fourth connecting portion and the fifth connecting portion;

the first main portion and the second main portion being insulated by the insulator;

the first battery, the second battery, the fourth battery, the third battery and the fifth battery being arranged sequentially in the longitudinal direction;

wherein the first connecting portion has a first surface at a side close to the second connecting portion, the second connecting portion has a second surface at a side close to the first connecting portion, the first slit is positioned between the first surface and the second surface;

the first main portion comprises a third surface, the third surface is provided along an edge of the first notch;

the third surface comprises a first arc section, two ends of the first arc section are respectively connected with the first surface and the second surface;

the first surface and the second surface are planes and parallel with each other;

the third surface further comprises a second arc section and a third arc section;

the second arc section connects the first surface and the first arc section, and the second arc section is inclined relative to the first surface toward a direction close to the second connecting portion; and the third arc section connects the second surface and the first arc section, the third arc section is inclined relative to the second surface toward a direction away from the first connecting portion, and an arc length of the third arc section is less than an arc length of the second arc section.

* * * * *